May 22, 1923.  R. F. BOWER  1,455,778

VEHICLE TRAFFIC SIGNAL

Filed Dec. 14, 1921  3 Sheets-Sheet 1

Inventor
Robert F. Bower

By Whittemore Hulbert Whittemore Belknap
Attorneys

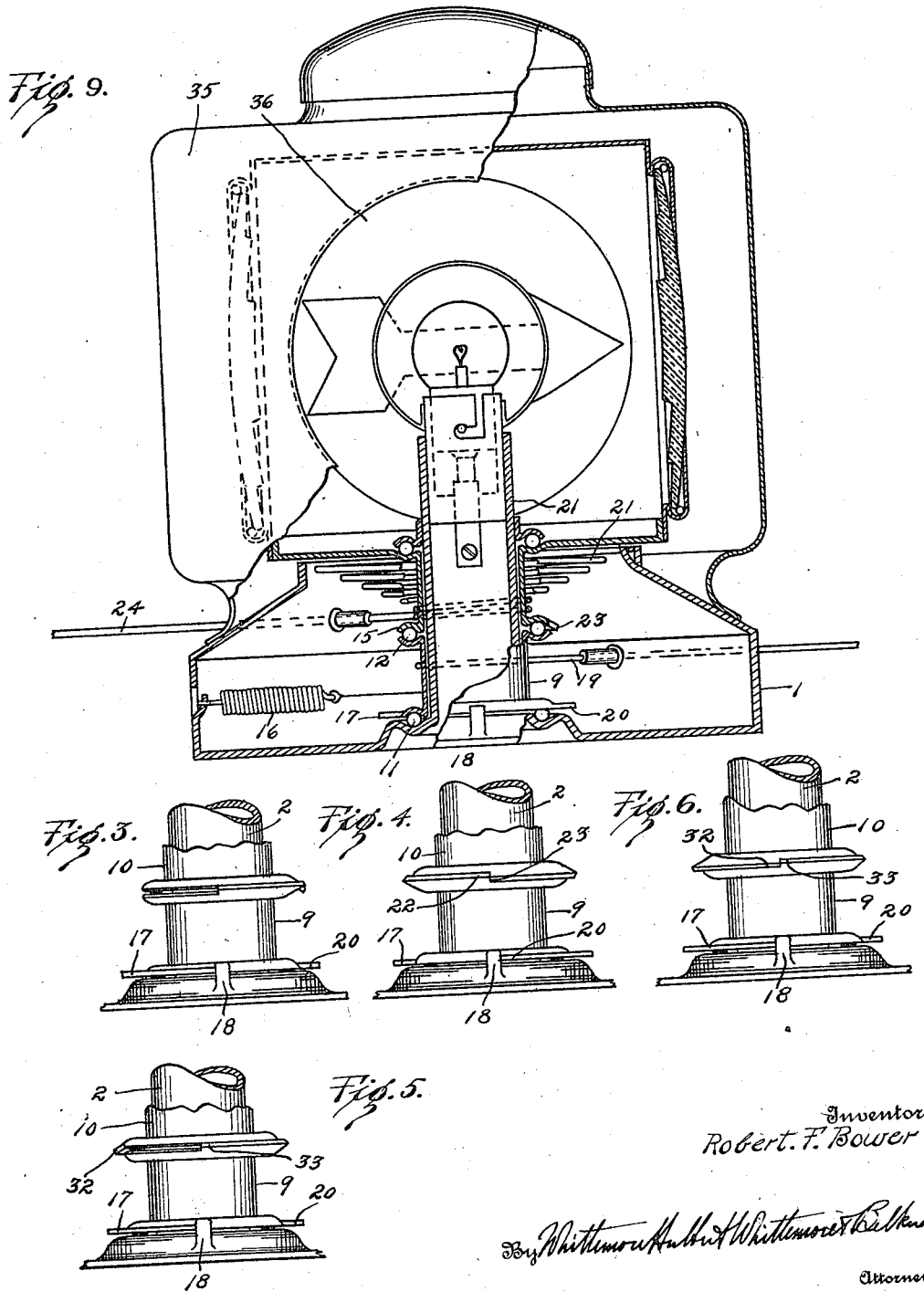

May 22, 1923.　　　　　　　　　　　　　　　　　　1,455,778
R. F. BOWER
VEHICLE TRAFFIC SIGNAL
Filed Dec. 14, 1921　　　　　　3 Sheets-Sheet 3
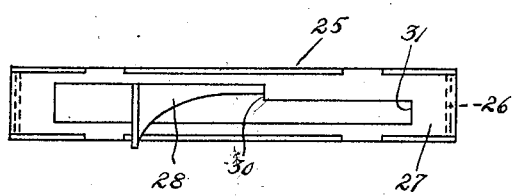
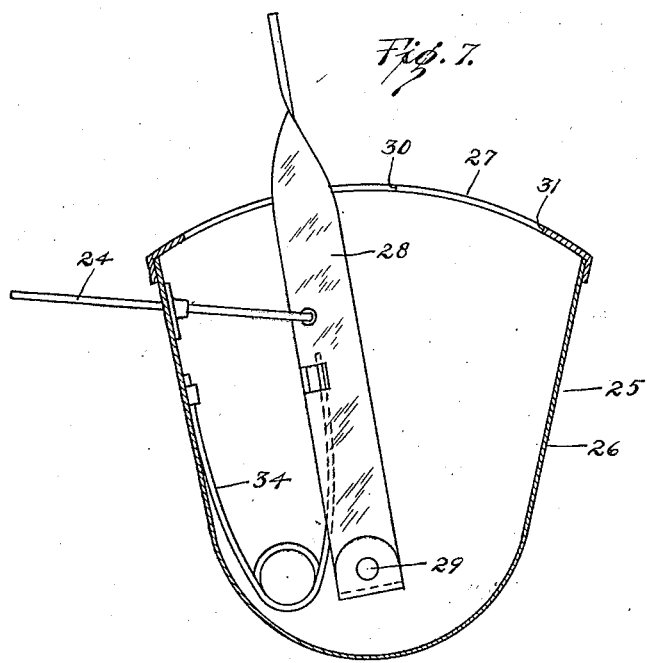
Inventor
Robert F. Bower Patented May 22, 1923.

1,455,778

UNITED STATES PATENT OFFICE.

ROBERT FRANKLIN BOWER, OF DETROIT, MICHIGAN.

VEHICLE TRAFFIC SIGNAL.

Application filed December 14, 1921. Serial No. 522,287.

*To all whom it may concern:*

Be it known that I, ROBERT F. BOWER, a citizen of the United States of America, residing at Detroit, in the county of Wayne and State of Michigan, have invented certain new and useful Improvements in Vehicle Traffic Signals, of which the following is a specification, reference being had to the accompanying drawings.

The invention relates to vehicle traffic signals and has for its object the provision of a tail light provided with indicating signals and rotatable about a vertical axis to display the indicating signals. Another object is to provide a vehicle traffic signal in which the carrier having the indicating signals is normally rotatable with a rotatable drum, but is adapted to be rotated independently thereof. Further objects of the invention reside in the novel features of construction and combinations and arrangements of parts as more fully hereinafter set forth.

In the drawings:

Figures 3, 4, 5 and 6 are elevations showing the positions of the carrier actuating drums;

Figure 7 is a sectional elevation of the hand control device;

Figure 8 is a plan view thereof;

Figure 9 is a sectional elevation of a modified construction of vehicle traffic signal.

Figure 1:
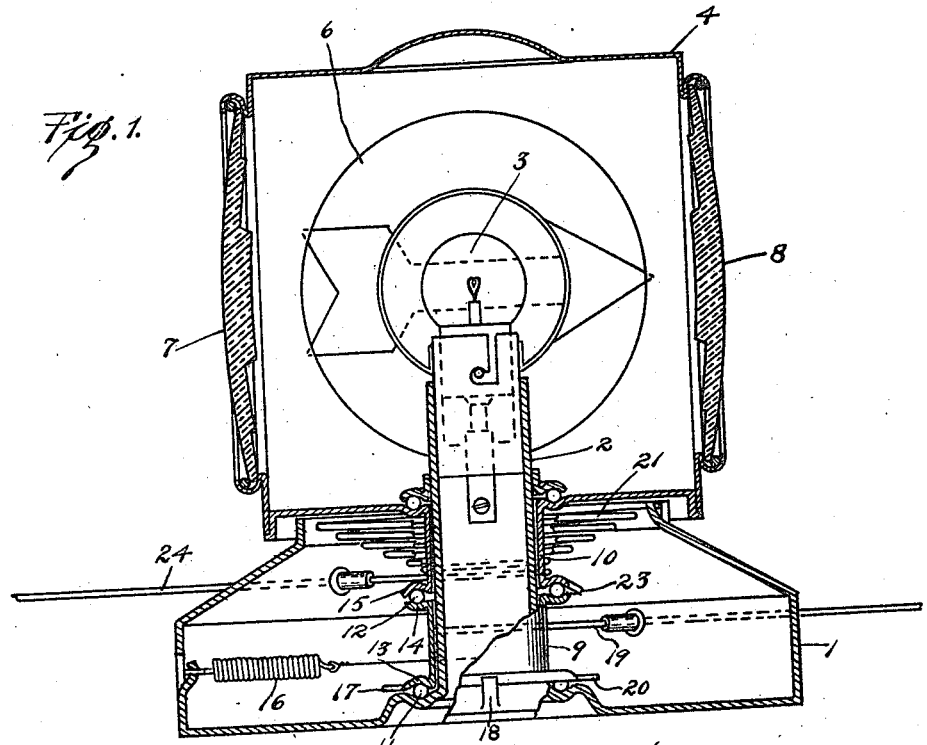
Figure 1 is a sectional elevation of a vehicle traffic signal embodying my invention.
Figure 2:
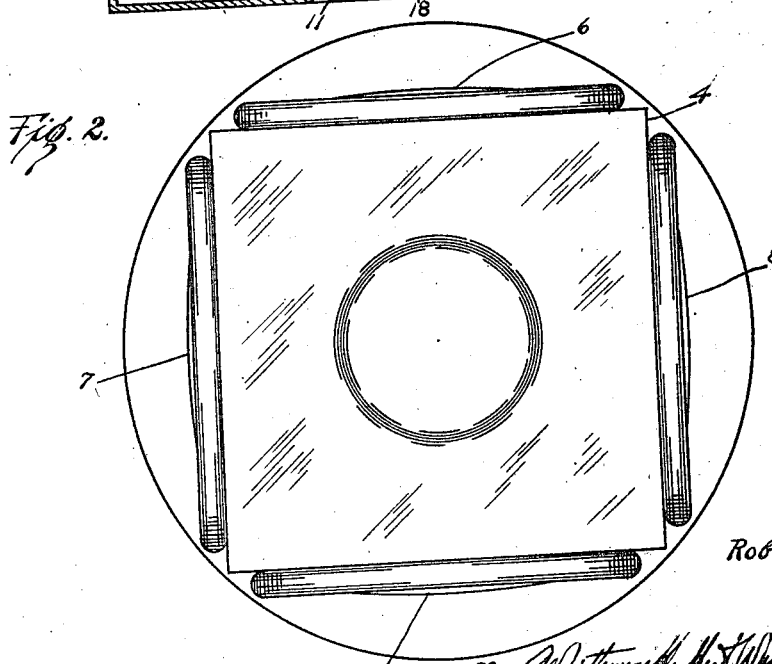
Figure 2 is a top plan view thereof.

1 is the base of the combined tail light and vehicle traffic signal having the central upwardly extending tubular portion 2 in the upper end of which is mounted the incandescent light bulb 3, the electrical connections passing upwardly through this tubular portion. 4 is the carrier which is rotatable in opposite directions. Throughout the description it is assumed in speaking of the clockwise and counter-clockwise directions of rotation of the carrier and other rotatable parts, that they are viewed from above. The carrier has in its normal position the usual colored tail light lens 5 upon its rear side, and upon its front side the lens 6 which is provided with suitable indicating means, such as an arrow, to indicate, when the carrier has been rotated counter-clockwise through an angle of 180°, that the driver of the vehicle intends to turn to the left. The left side of the carrier has the lens 7 which is provided with suitable indicating means, such as an arrow, to indicate, when the carrier has been rotated counter-clockwise through an angle of 90°, that the driver of the vehicle intends to turn to the right. The right side of the carrier has the lens 8 provided with suitable indicating means such as the word "Stop" to indicate, when the carrier has been rotated through an angle of 90°, that the driver of the vehicle intends to stop. The carrier 4 is normally held in position to display the lens 5 so that normally, the device functions as a tail light. This carrier is rotated to display the signal "Stop" preferably by means of the mechanism for applying the service brake of the motor vehicle, while rotation of the carrier to display either of the signals to indicate a right or left turn is accomplished by manual operation.

9 is a lower drum surrounding the tubular portion 2 and rotatably mounted upon the base 1. 10 is an upper drum surrounding the tubular portion 2 and rotatably mounted upon the lower drum 9, this upper drum being connected at its upper end to the carrier 4 which latter rotates with the upper drum. Suitable anti-friction bearings such as the ball bearings 11 and 12 are respectively provided between the flange 13 at the lower end of the lower drum 9 and the base 1, and between the flange 14 at the upper end of the lower drum 9 and the flange 15 at the lower end of the upper drum 10. For normally holding the lower drum 9 in a predetermined position of rotation, there is the coil spring 16 connected at one end to the upwardly extending peripheral flange of the base 1 and at the other end to the lower drum, the connection being such that the lower drum is rotated by this coil spring in a counter-clockwise direction. To limit the counter-clockwise rotation of this drum, the lower flange 13 has the stop 17 which engages the stop 18 upon the base 1, the normal position of the parts being shown in Figure 3. The lower drum 9 is adapted to be rotated in a clockwise direction through an angle of 90° by the flexible connection 19, such as a stranded wire or the like, passing through the peripheral flange of the base 1 and connected to the mechanism for actuating the service brake of the motor vehicle. To limit the rotation of this lower drum in this clockwise direction, the lower flange 13 of the drum has the stop 20 which is adapted to engage the stop 18 upon the base, the parts occupying the position shown in Figure 4, when actuated through application of the service brake of the motor vehicle.

The upper drum 10 normally rotates with the lower drum 9, there being the coil spring 21 connected at one end to the peripheral flange of the base 1 and at the other end to the upper drum to normally rotate the latter in a clockwise direction; but to limit the rotation in this direction of the upper drum relative to the lower drum there are the cooperating stops 22 and 23 respectively upon the upper flange 14 of the lower drum and the lower flange 15 of the upper drum. The coil spring 16 is of greater strength than the coil spring 21, the arrangement being such that in the normal positions of the parts shown in Figure 3, the tail light lens 5 will be displayed and upon operation of the motor vehicle service brake which rotates the lower drum through an angle of 90° in a clockwise direction, the upper drum and the carrier will be rotated in the same direction through an angle of 90° by the coil spring 21 to bring the signal "Stop" into display.

To display the lens 7 to indicate that a right turn is to be made, the upper drum 10 is rotated in counter-clockwise direction independently of the lower drum 9 which occupies its normal position with the stop 17 abutting the stop 18. This is accomplished by the flexible connection 24, such as a stranded wire or the like, which passes through the peripheral flange of the base 1 and is connected to the upper drum. This flexible connection 24 extends to the hand control device 25 which is positioned upon the motor vehicle so that it is within easy reach of the driver and has the U-shaped casing 26 within the slotted cover 27 through which passes the hand lever 28 pivotally mounted at 29 near the lower end of the casing. To control the position of the upper drum 10 to bring the right turn lens 7 into display position, the cover 27 has the stop or shoulder 30 which is engageable by the hand lever 28. After the hand lever 28 has been brought into engagement with the stop or shoulder 30, the upper and lower drums 10 and 9 respectively occupy the positions shown in Figure 5.

To bring the left turn lens 6 of the carrier 4 into display position, the upper drum 10 is also moved in a counter-clockwise direction independently of the lower drum 9 by swinging the hand lever 28 beyond the stop or shoulder 30 in the cover 27 and adjacent to the stop or shoulder 31 in the cover. However, the rotation of the upper drum 10 in this direction and relative to the lower drum 9 is limited by means of the cooperating stops 32 and 33 respectively upon the lower flange 15 of the upper drum and the upper flange 14 of the lower drum, the drums occupying the positions shown in Figure 6 when the left turn lens is at the rear side of the combined tail light and vehicle traffic signal.

For the purpose of maintaining the flexible connection 24 taut, there is the spring 34 within the casing 26 and abutting the hand lever 28. This spring, however, does not affect the operation of the device since the coil spring 21 is of greater strength than this spring.

In operation, the normal positions of the lower and upper drums 9 and 10 respectively is as shown in Figure 3 in which the stop 17 upon the lower flange of the lower drum and the stop 18 upon the base are in engagement and the stop 22 upon the upper flange of the lower drum and the stop 23 upon the lower flange of the upper drum are in engagement, the coil spring 21 yieldably holding the stop 23 against the stop 22. In this position, the device functions as a tail light, the tail light lens 5 being in display position at the rear of the device. Upon application of the motor vehicle service brake, the lower drum 9 is rotated through an angle of 90° in a clockwise direction, as is also the upper drum 10 by means of the coil spring 21, to bring the stop 20 upon the lower flange of the lower drum into engagement with the stop 18 upon the base, as shown in Figure 4. This operation rotates the carrier 4 in the same direction to bring the stop signal lens 8 into display position at the rear of the device. If the driver of the motor vehicle desires to make a turn he may indicate his intentions by manually operating the hand lever 28 to bring the same into engagement with either the stop or shoulder 30 of the cover 27 or adjacent to the stop or shoulder 31 thereof. The adjusting of this hand lever through the flexible connection 24 rotates the upper drum 10 in a counter-clockwise direction, and if the hand lever is brought into engagement with the stop or shoulder 30, the right turn lens 7 of the carrier 4 is rotated through an angle of 90° and brought into display position at the rear of the device. However, if the hand lever is adjustable beyond the stop or shoulder 30, the rotation of the upper drum 10 in the same direction is continued until the stop 32 upon the lower flange of the upper drum and the stop 33 upon the upper flange of the lower drum come into engagement at which time the left turn lens 6 of the carrier is brought into display position at the rear of the device.

To avoid breakage of any of the parts in the event that either of the flexible connections 19 or 24 are not properly adjusted to length, it is obvious that yielding connections may be inserted between the ends of these flexible connections, these yielding connections being sufficiently strong to operate the drums but yielding after engagement of the different stops.

In the modified construction shown in Figure 9, the general arrangement of parts is the same, but a casing 35 having the opening 36 in its rear side and registering with either the tail light lens or the traffic signal lenses, is provided mounted upon and secured to the base.

What I claim as my invention is:

1. The combination with a rotatable member, of a concentric rotatable carrier having indicating signals, said carrier being normally rotatable with said rotatable member, but being adapted to be rotated independently thereof about the same axis.

2. The combination with a base, of a member rotatably mounted upon said base, a concentric carrier having indicating signals, means for rotating said carrier upon rotation of said rotatable member, and means for rotating said carrier independently of said rotatable member about the same axis.

3. The combination with a base, of a member rotatably mounted upon said base, a carrier having indicating signals, a coil spring for normally rotating said carrier in one direction, a stop upon said rotatable member for limiting the rotation of said carrier in said direction, and means for rotating said carrier about the same axis relative to said rotatable member in the opposite direction.

4. The combination with a base, of a drum rotatably mounted upon said base, a second drum in substantial axial alignment with said first-mentioned drum and rotatably mounted thereon, a carrier upon said second drum, having indicating signals, means for normally holding said first-mentioned drum in a predetermined position of rotation, cooperating stops between said first and second-mentioned drums for limiting the relative rotation thereof in one direction, means for normally rotating said second-mentioned drum in one direction to maintain said stops in engagement, and means for rotating said second-mentioned drum in the opposite direction independently of said first-mentioned drum.

5. The combination with a base, of a drum rotatably mounted thereon, a coil spring for normally holding said drum in one position of rotation, means connected to said drum for rotating the same in the opposite direction, a second drum in substantially axial alignment with said first-mentioned drum and rotatably mounted thereon, a carrier having a tail light lens and traffic signalling lenses, said carrier being mounted upon said second-mentioned drum and rotatable therewith, a coil spring connected to said base and second-mentioned drum for normally rotating said second-mentioned drum in one direction, cooperating stops upon said first and second-mentioned drums for limiting said rotation of said second-mentioned drum, and means for manually rotating said second-mentioned drum in the opposite direction to display certain of said traffic signalling lenses.

6. The combination with a base having a substantially central tubular portion, of a drum surrounding said tubular portion and rotatably mounted upon said base, means for normally rotating said drum in one direction, means for rotating said drum in the opposite direction, cooperating stops upon said base and drum for limiting said rotation in opposite directions of said drum, a second drum surrounding said tubular portion and rotatably mounted upon said first-mentioned drum, a carrier having a tail light lens upon one side and traffic signalling lenses upon other sides, said carrier being mounted upon said second-mentioned drum and being rotatable therewith, a coil spring connected to said base and said second-mentioned drum for normally rotating said second-mentioned drum in one direction, means for manually rotating said second-mentioned drum in the opposite direction, and cooperating stops upon said first and second-mentioned drums for limiting the rotation of said second-mentioned drum relative to said first-mentioned drum in opposite directions.

7. The combination with a tail light rotatable about a substantially vertical axis and provided with a plurality of indicating signals, of means for normally holding said light in a position to operate as a tail light, means for rotating said light from said position to display one of said signals, and independent manually operated means for rotating said light about the same axis to display the other signals.

8. In a vehicle, the combination with a brake and means for operating said brake, of a tail light upon said vehicle rotatable about a substantially vertical axis and provided with a plurality of indicating signals, means for normally holding said light in position to operate as a tail light, means operated by said brake operating means for rotating said light about the same axis to display one of said signals and independent means for rotating said light to display the other signals.

9. The combination with a rotatable member provided with a plurality of indicating signals, of means for normally holding said member in a position to operate as a tail light, means for rotating said member from said normal position to display one of said signals and independent means for rotating said member about the same axis to display the other signals.

10. The combination with a rotatable member provided with a plurality of indicating signals, including tail light, a stop signal and direction signals, of means for normally holding said member to display said tail light, means for rotating said member to display said stop signal and independent means for rotating said member about the same axis to display said direction signals.

11. The combination with a rotatable member provided with a plurality of indicating signals including tail light, a stop signal and direction signals, of means for normally holding said member in position to display said tail light, means for oppositely rotating said member to display said direction signals, and independent means for rotating said member about the same axis to display said stop signal.

12. In a vehicle, the combination with brake operating means, of a rotatable member provided with a plurality of indicating signals, means for normally holding said member in a position to operate as a tail light, means automatically operated by said brake operating means for rotating said member to display one of said signals and independent means for rotating said member about the same axis to display the other signals.

13. The combination with a rotatable member provided with a plurality of indicating signals adapted to be singly displayed, of means for normally holding said member in a position to operate as a tail light, means for rotating said member from said normal position to display one of said signals, and means for rotating said member about the same axis independently of said first mentioned means to display the other signals.

14. The combination with a rotatable member provided with a plurality of indicating signals, of a housing for said member provided with means allowing said signals to be singly displayed, means for normally holding said member to operate as a tail light, means for rotating said member from said normal position to display one of said signals, and independent means for rotating said member about the same axis to display the other signals.

In testimony whereof I affix my signature.

ROBERT FRANKLIN BOWER.